Patented June 9, 1925.

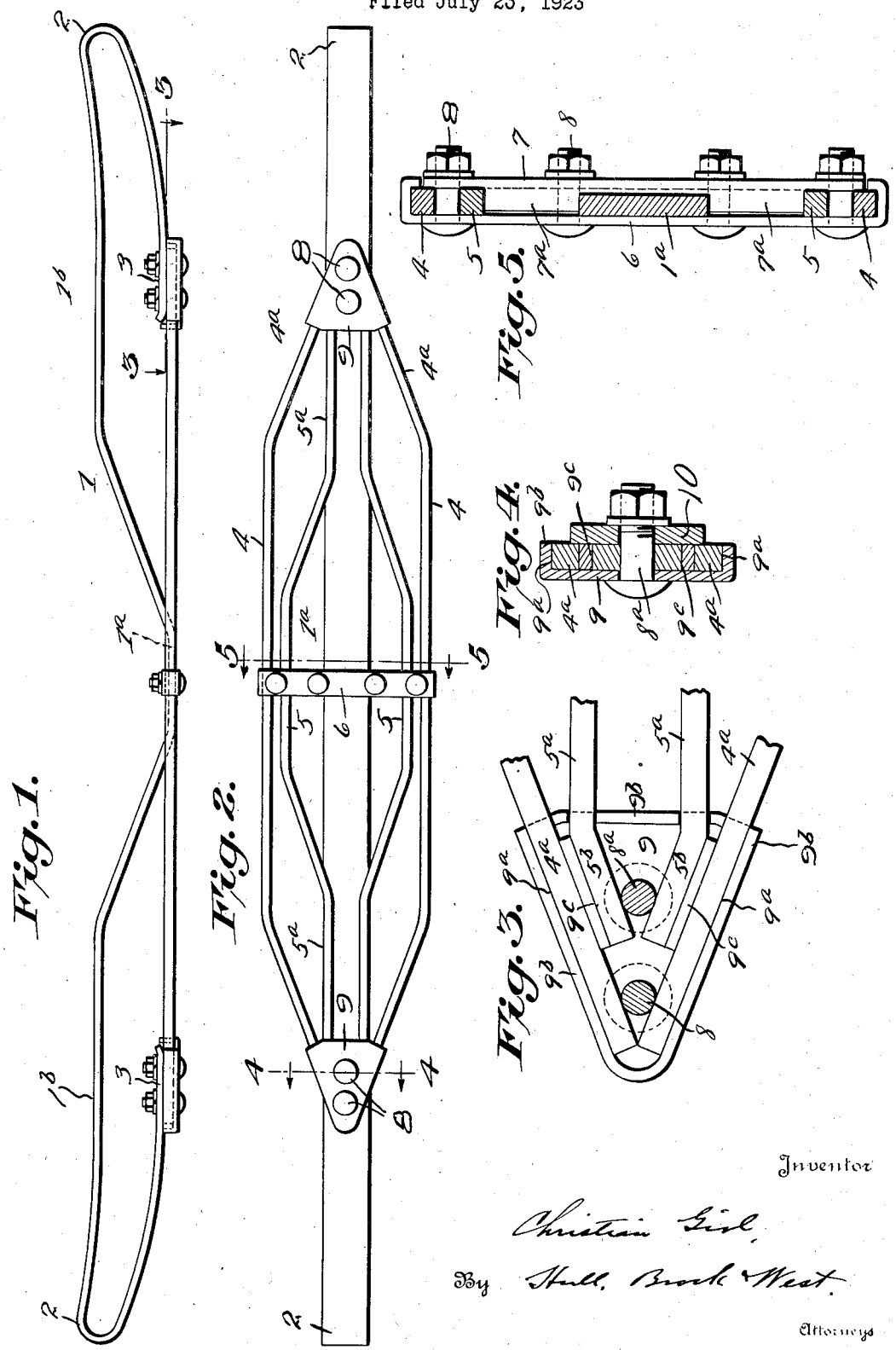

1,541,040

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed July 23, 1923. Serial No. 653,146.

*To all whom it may concern:*

Be it known that I, CHRISTIAN GIRL, a citizen of the United States, residing at Kalamazoo, in the county of Kalamazoo and State of Michigan, have invented a certain new and useful Improvement in Bumpers, of which the following is a full, clear, and exact description, reference being had to the accompanying drawings.

This invention relates to bumpers for automobiles or similar vehicles, and more particularly to bumpers of the type wherein the central portion is widened for additional protection of the vehicle against impacts. It is the general purpose and object of the invention to provide a bumper of this type which is strong and efficient in operation; which may be conveniently and quickly assembled and disassembled; which will be sightly and attractive in appearance; and which will be capable of withstanding all ordinary incidents of use.

I accomplish the foregoing object, and other and more limited objects which will appear hereinafter, by the construction illustrated in the drawings, wherein Fig. 1 represents a plan view of a bumper embodying my invention; Fig. 2 a front elevation of such bumper; Fig. 3 a sectional detail corresponding to the line 3—3 of Fig. 1; and Figs. 4 and 5 sectional details corresponding respectively to the lines 4—4 and 5—5 of Fig. 2.

Describing the parts by reference characters, 1 denotes generally a rear or supplemental section comprising a bar in the shape of a flat spring plate, which bar extends the full width or length of the bumper and has its end portions bent forwardly to provide loops 2, the extreme ends 3 being presented toward and spaced from each other. The central portion of the bar 1 is bent forward into a blunt V, with the central part $1^a$ of such V extending between the bars of the impact section which will now be described. On each side of the central portion the bar 1 is provided with transversely extending portions $1^b$ constituting members for attaching the bumper to the vehicle side members.

The impact section comprises a pair of upper and lower bars 4, which are preferably square in section and identical in construction, each having end portions $4^a$ which are bent at an angle to the central portion. The bars 4, while identical in construction, are oppositely arranged with respect to the bar 1, whereby the central portion of the upper bar is located above the rear bar 1 and the central portion of the lower bar is located below such bar 1, while the end portions of the two bars converge toward each other.

In addition to the bars 4 there is a pair of intermediate bars, each bar and the central portion thereof being designated by the numeral 5. The bars 5 are identical in construction but are reversely arranged and are so shaped as to produce, when assembled, a central approximately diamond-shaped portion and upper and lower parallel portions $5^a$ on each side of such central portion. The extreme end portions $5^b$ of each bar 5 are deflected toward the corresponding end portions of the other bar 5.

The central portion $1^a$ of the plate or bar 1 extends between the central portions of the bars 4 and 5 and is secured thereto by means of a front clamping plate 6, a rear clamping plate 7, and bolts 8, $8^a$. The rear clamping plate is provided with projections $7^a$ adapted to engage the lower and upper surfaces of the upper and lower bars 5, respectively, and to receive therebetween the central portion $1^a$ of the bar or plate 1. The ends of the front clamping plate 6 are hooked to engage the top and bottom bars 4, the bolts 8 serving to space each bar 4 from its adjacent bar 5.

The ends of the bars 4 and 5 are secured to the corresponding ends 3 of the bar 1 by means of suitable clamping plates, which are identical for each end of the assembly. 9 denotes a front clamping plate, which is employed at each end of the impact section, said clamping plate being triangular in outline and having an upper and a lower recessed seat $9^a$ which are adapted to receive the parts $4^a$ of the plates 4, the upper and lower walls of said seats being formed by upper and lower parts of a marginal flange $9^b$. The extreme ends of the parts $4^a$ abut against each other at the end of the triangular apex, being maintained in contact with their portions of the marginal flange by the outermost bolt 8.

The end portions $5^b$ of the opposed bars 5 abut against upper and lower seats $9^c$, respectively, being maintained in contact with such seats by the innermost bolt 8ᵃ which engages the inner opposed sides of the parts 5ᵇ.

The parts are secured together and to the plate 9 by means of a cover plate 10 and the bolts 8, 8ᵃ connecting said plates together and to the ends 3 of the bar 1.

The construction illustrated and described herein provides a simple and efficient bumper of the type having a widened central impact portion; one which can be conveniently and quickly assembled and disassembled; and one which is adapted to withstand the ordinary incidents of use.

Having thus described my invention, what I claim is:

1. A bumper comprising attaching members and an impact section connecting such members, said impact section comprising an upper and a lower bar having their central portions vertically spaced, with the end portions of each bar converging toward the end portions of the other bar, a pair of intermediate bars interposed between the first mentioned bars and each having a central portion extending substantially parallel with the central portion of the first mentioned impact bar adjacent thereto, each of the intermediate bars having portions on each side of the central portion which are bent toward corresponding portions of the opposed intermediate bar, and each intermediate bar having portions extending outwardly from the last mentioned portions and substantially parallel with corresponding portions of the other intermediate bar, and means connecting the ends of the impact bars together and to the corresponding ends of the said members.

2. A bumper comprising attaching members and an impact section connecting such members, said impact section comprising an upper and a lower bar having their central portions vertically spaced, with the end portions of each bar converging toward the end portions of the other bar, a pair of intermediate bars interposed between the first mentioned bars and each having a central portion extending substantially parallel with the central portion of the first mentioned impact bar adjacent thereto, each of the intermediate bars having portions on each side of the central portion which are bent toward corresponding portions of the opposed intermediate bar, and each intermediate bar having portions extending outwardly from the last mentioned portions and substantially parallel with corresponding portions of the other intermediate bar, each intermediate bar having extreme end portions substantially parallel with the end portions of the first mentioned impact bars, and means connecting the ends of the impact bars together and to the said members.

3. A bumper comprising a rear section including a bar having its ends bent forwardly and toward each other and a central impact section connecting such ends, said impact section comprising an upper and a lower bar having their central portions spaced above and below the auxiliary bar, respectively, with the end portions of each bar converging toward the end portions of the other bar, a pair of intermediate bars interposed between the first mentioned bars and each having a central portion extending substantially parallel with the central portion of the first mentioned impact bar adjacent thereto, each of the intermediate bars having portions on each side of the central portion which are bent toward corresponding portions of the opposed intermediate bar, and each intermediate bar having portions extending outwardly from the last mentioned portions and substantially parallel with corresponding portions of the other intermediate bar, means connecting the ends of the impact bars together and to the corresponding ends of the auxiliary bar, and means connecting the central portions of said bars.

4. A bumper comprising a rear section including a bar having its ends bent forwardly and toward each other and a central impact section connecting such ends, said impact section comprising an upper and a lower bar having their central portions spaced above and below the auxiliary bar, respectively, with the end portions of each bar converging toward the end portions of the other bar, a pair of intermediate bars interposed between the first mentioned bars and having central portions each extending substantially parallel with the central portions of the first mentioned impact bar adjacent thereto, each of the intermediate bars having portions on each side of the central portion which are bent toward corresponding portions of the opposed intermediate bar, and each intermediate bar having portions extending outwardly from the last mentioned portions and substantially parallel with corresponding portions of the other intermediate bar, each intermediate bar having extreme end portions substantially parallel with the end portions of the first mentioned impact bars, said auxiliary bar having its central portion projected toward and connected to the central portions of the impact bars, and means connecting the ends of the impact bars to the ends of the auxiliary bar.

5. A bumper comprising a rear section including a bar having its ends bent forwardly and toward each other and a central impact section connecting such ends, said impact section comprising an upper and a lower bar having their central portions extending substantially parallel with and spaced respectively above and below the first mentioned bar and each having end portions converging toward the end portions of the other for attachment to the ends of the first mentioned bar, an upper and a lower intermediate impact bar interposed between the first mentioned bars and each having a central portion adjacent to and substantially parallel with the central portion of the first mentioned impact bar adjacent thereto, the central portion of the first mentioned bar being projected inwardly between the central portions of the impact bars, clamping means securing together the central portions of all of said bars, and clamping means securing the ends of the impact bars to the ends of the first mentioned bar.

6. A bumper having attaching members and an impact section, said section comprising an upper and a lower impact bar, each bar having its ends converging toward the corresponding ends of the other bar, a pair of intermediate impact bars each having its ends converging toward the corresponding ends of the other bar, and means for securing such ends to the ends of the attaching members, said means comprising a pair of clamping plates for each end of the impact section, one of such plates having convergent seats for the upper and lower surfaces of the ends of upper and lower impact bars, respectively, and bolts for securing the said plates together, the said bolts being arranged to engage the lower and the upper surfaces of the end portions of said impact bars, respectively.

7. A bumper having attaching members and an impact section, said section comprising an upper and a lower external bar and an upper and lower intermediate bar, the ends of each external bar being directed toward the ends of the opposed external bar and the ends of each intermediate bar being directed toward the ends of the opposed intermediate bar, and means for securing the ends of the impact bars to the said members, said means comprising a clamping plate for each end of the impact section, each clamping plate having a pair of upper and a pair of lower seats adapted to engage respectively the upper surfaces of the ends of the upper external and intermediate bars and of the ends of the lower, external and intermediate bars, a plate adapted to be clamped to each of the first mentioned plates, and bolts connecting said plates and the said members, the said bolts being adapted and arranged to engage the surfaces of the end portions of the bars which are opposite the seating surfaces thereby to force the latter surfaces against their respective seats.

In testimony whereof, I hereunto affix my signature.

CHRISTIAN GIRL.